United States Patent
Liu et al.

(10) Patent No.: US 8,306,819 B2
(45) Date of Patent: Nov. 6, 2012

(54) ENHANCED AUTOMATIC SPEECH RECOGNITION USING MAPPING BETWEEN UNSUPERVISED AND SUPERVISED SPEECH MODEL PARAMETERS TRAINED ON SAME ACOUSTIC TRAINING DATA

(75) Inventors: Chaojun Liu, Kirkland, WA (US); Yifan Gong, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 757 days.

(21) Appl. No.: 12/400,528

(22) Filed: Mar. 9, 2009

(65) Prior Publication Data

US 2010/0228548 A1 Sep. 9, 2010

(51) Int. Cl.
G10L 15/06 (2006.01)
G10L 15/00 (2006.01)

(52) U.S. Cl. .......... 704/244; 704/234; 704/251

(58) Field of Classification Search .......... None
See application file for complete search history.

(56) References Cited

U.S. PATENT DOCUMENTS

| | | | |
|---|---|---|---|
| 5,479,573 A | 12/1995 | Keeler et al. | |
| 5,727,124 A * | 3/1998 | Lee et al. | 704/233 |
| 5,809,490 A | 9/1998 | Guiver et al. | |
| 6,076,058 A | 6/2000 | Chengalvarayan | |
| 6,636,841 B1 | 10/2003 | Austin et al. | |
| 7,209,908 B2 | 4/2007 | Li et al. | |
| 7,254,538 B1 | 8/2007 | Hermansky et al. | |
| 7,457,745 B2 * | 11/2008 | Kadambe et al. | 704/216 |
| 2005/0065793 A1 | 3/2005 | Choi et al. | |
| 2006/0235687 A1 | 10/2006 | Carus et al. | |
| 2007/0033042 A1 * | 2/2007 | Marcheret et al. | 704/255 |
| 2007/0077987 A1 | 4/2007 | Gururajan et al. | |
| 2007/0129943 A1 * | 6/2007 | Lei et al. | 704/240 |
| 2008/0004876 A1 * | 1/2008 | He et al. | 704/243 |
| 2008/0270133 A1 | 10/2008 | Tian et al. | |
| 2009/0024390 A1 * | 1/2009 | Deshmukh et al. | 704/236 |

OTHER PUBLICATIONS

Emmanuel Candes, et al. "Error Correction via Linear Programming" Retrieved at <<http://www.math.ucla.edu/~tao/preprints/FOCS05.pdf>>p. 1-14, 2005.
Brause, Rudiger W. "Self-Organized Learning in Multi-Layer Networks" Retrieved at<<http://citeseerx.ist.psu.edu/viewdoc/download?doi=10.1.1.56.5610&rep=rep1&type=pdf>>p. 1-19, 1995.
Leggetter et al. "Maximum Likelihood Linear Regression for Speaker Adaptation of Continuous Density Hidden Markov Models" Retrieved at <<http://www.ingentaconnect.com/content/ap/la/1995/00000009/00000002/art00010>> p. 1-1, 1995.
Gales M.J.F "Maximum Likelihood Linear Transformations for Hmm-Based Speech Recognition"Retrieved at <<http://scholar.google.co.in/scholar?hl=en&lr=&cluster=15472219274208489465>> p. 1-19, 1998.

(Continued)

Primary Examiner — Talivaldis Ivars Smits
(74) Attorney, Agent, or Firm — Lee & Hayes, PLLC

(57) ABSTRACT

Techniques for enhanced automatic speech recognition are described. An enhanced ASR system may be operative to generate an error correction function. The error correction function may represent a mapping between a supervised set of parameters and an unsupervised training set of parameters generated using a same set of acoustic training data, and apply the error correction function to an unsupervised testing set of parameters to form a corrected set of parameters used to perform speaker adaptation. Other embodiments are described and claimed.

20 Claims, 8 Drawing Sheets

OTHER PUBLICATIONS

Gauvain, et al. "Maximum a-Posteriori Estimation for Multivariate Gaussian Mixture Observations of Markov Chains" Retrieved at <<http://ieeexplore.ieee.org/stamp/stamp.jsp?arnumber=00279278>>p. 1-9, 1994.

Anastasakos, et al. "The Use of Confidence Measures in Unsupervised Adaptation of Speech Recognizers" Retrieved at <<http://www.isca-speech.org/archive/icslp_1998/i98_0599.html>>p. 1-1, 1998.

Wallhoff, et al."Frame Discriminative and Confidence-driven Adaptation for LVCSR" Retrieved at <<http://ieeexplore.ieee.org/stamp/stamp.jsp?arnumber=862112&isnumber=18687>>p. 1-4, 2000.

Pitz, et al. "Improved MLLR Speaker Adaptation using Confidence Measures for Conversational Speech Recognition" Retrieved at <<http://www.isca-speech.org/archive/icslp_2000/i00_4548.html>>p. 1-1, 2000.

Padmanabdhan, et al. "Lattice-based Unsupervised MLLR for Speaker Adaptation" Retrieved at <<http://www.isca-speech.org/archive/asr2000/asr0_128.html>> p. 1-1, 2000.

Uebel, et al. "Improvements in Linear Transforms based Speaker Adaptation" Retrieved at<<http://ieeexplore.ieee.org/stamp/stamp.jsp?arnumber=940764&isnumber=20365>>p. 1-4, 2001.

Wang, et al. "A Confidence-Score based Unsupervised Map Adaptation for Speech Recognition" Retrieved at <<http://ieeexplore.ieee.org/stamp/stamp.jsp?arnumber=01197181>>p. 1-5, 2002.

Zhu, et al. "Combining Speaker Identification and BIC for Speaker Diarization" Retrieved at <<http://www.isca-speech.org/archive/interspeech_2005/i05_2441.html>>p. 1-1, 2005.

Kemp, et al. "Estimating Confidence Using Word Lattices" Retrieved at <<http://www.isca-speech.org/archive/eurospeech_1997/e97_0827.html>>p. 1-1, 1997.

Wessel, et al. "Using Word Probabilities as Confidence Measures" Retrieved at <<http://ieeexplore.ieee.org/stamp/stamp.jsp?arnumber=674408&isnumber=14820>>p. 1-4, 1998.

Zavaliagkos, et al. "Utilizing Untranscribed Training Data to Improve Performance" Retrieved at <<http://citeseerx.ist.psu.edu/viewdoc/download;jsessionid=D63687F4204A0E8DFA0102248BCA3F5A?doi=10.1.1.27.5882&rep=rep1&type=pdf>>p. 1-5, 1998.

Kemp, et al. "Unsupervised Training of a Speech Recognizer: Recent Experiments" Retrieved at <<http://citeseerx.ist.psu.edu/viewdoc/download?doi=10.1.1.41.2362&rep=rep1&type=pdf>>p. 1-4, 1999.

Lamel, et al. "Lightly Supervised Acoustic Model Training" Retrieved at <<http://citeseerx.ist.psu.edu/viewdoc/download?doi=10.1.1.18.8086&rep=rep1&type=pdf>> p. 1-19, 2000.

Wessel,et al. "Unsupervised Training of Acoustic Models for Large Vocabulary Continuous Speech Recognition" Retrieved at <<http://ieeexplore.ieee.org/stamp/stamp.jsp?arnumber=1369309&isnumber=29967>>p. 1-9, 2005.

Saltau, et al. "The IBM Conversational Telephony System for Rich Transcription" Retrieved at <<http://research.microsoft.com/users/gzweig/Pubs/ICASSP05b.pdf>>p. 1-4, 2005.

Sethy, et al. "Improvements in English ASR for the MALACH project using Syllable-Centric Models" Retrieved at <<http://ieeexplore.ieee.org/stamp/stamp.jsp?arnumber=1318416&isnumber=29213>>p. 1-6, 2003.

Ramabhadran, et al. "Towards Automatic Transcription of Large Spoken Archives—English ASR for the MALACH Project" Retrieved at <<http://ieeexplore.ieee.org/stamp/stamp.jsp?arnumber=1198756&isnumber=26983>>p. 1-4, 2003.

Sethy, et al."Improvements in English ASR for the MALACH project using Syllable-Centric Models" Retrieved at <<http://ieeexplore.ieee.org/stamp/stamp.jsp?arnumber=1318416&isnumber=29213>>p. 1-6, 2003.

Oard, et al. "Building an Information Retrieval test Collection for Spontaneous Conversational Speech" Retrieved at <<http://papers.idc.upenn.edu/SIGIR2004/IR.pdf>>p. 1-8, 2004.

Byrne, et al. "Automated Recognition of spontaneous speech for access to multilingual oral history archives" Retrieved at <<http://ieeexplore.ieee.org/stamp/stamp.jsp?arnumber=1306515&isnumber=29001>>p. 1-16, 2004.

Saon, et al. "An Architecture for Rapid Decoding of Large Vocabulary Conversational Speech" Retrieved at <<http://www.isca-speech.org/archive/eurospeech_2003/e03_1977.html>>p. 1-1, 1977.

Ramabhadran Bhuvana,"Exploiting Large Quantities of Spontaneous Speech for Unsupervised Training of Acoustic Models", Interspeech 2005, pp. 4, 2005.

Gollan, et al."Confidence Scores for Acoustic Model Adaptation", 2008 IEEE, ICASSP 2008, pp. 4289-4292.

Digalakis, Rtischev, Neumeyer, "Speaker Adaptation Using Constrained Reestimation of Gaussian Mixtures", IEEE Transactions on Speech and Audio Processing, vol. 3, No. 5, 1995, pp. 357-366.

* cited by examiner

400

GENERATE AN ERROR CORRECTION FUNCTION FOR AN AUTOMATIC SPEECH RECOGNITION SYSTEM, THE ERROR CORRECTION FUNCTION REPRESENTING A MAPPING BETWEEN A SUPERVISED SET OF PARAMETERS AND AN UNSUPERVISED TRAINING SET OF PARAMETERS GENERATED USING A SAME SET OF ACOUSTIC TRAINING DATA
*402*

APPLY THE ERROR CORRECTION FUNCTION TO AN UNSUPERVISED TESTING SET OF PARAMETERS TO FORM A CORRECTED SET OF PARAMETERS USED TO PERFORM SPEAKER ADAPTATION
*404*

ENHANCED AUTOMATIC SPEECH RECOGNITION USING MAPPING BETWEEN UNSUPERVISED AND SUPERVISED SPEECH MODEL PARAMETERS TRAINED ON SAME ACOUSTIC TRAINING DATA

BACKGROUND

Automatic speech recognition technology typically utilizes a corpus to translate speech data into text data. A corpus is a database of speech audio files and text transcriptions in a format that can be used to form acoustic models. A speech recognition engine may use one or more acoustic models to perform text transcriptions from speech data received from a given user. When an acoustic model is tailored for a particular speaker, the number of errors in a text transcription is relatively low. When an acoustic model is designed for a general class of speakers, however, the number of transcription errors tends to rise for a given speaker. To avoid this, some automatic speech recognition systems implement adaptation techniques to tailor a general acoustic model to a specific speaker. Adaptation techniques may involve receiving training data or testing data from a particular speaker, and either adapts an acoustic model to better match the data, or alternatively, adapts the data to match the acoustic model. The former is generally referred to as "model space adaptation" while the latter is referred to as "feature space adaption." Model space adaptation and feature space adaptation are two different ways to apply adaptation techniques and are generally mathematically equivalent. Conventional solutions for implementing model space adaptation and feature space adaptation, however, are relatively complex and therefore typically expensive to implement. Consequently, improvements in these and other adaptation techniques are desirable. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended to be as an aid in determining the scope of the claimed subject matter.

Various embodiments are generally directed to techniques for enhanced automatic speech recognition (ASR) systems. Some embodiments are particularly directed to enhanced adaptation techniques for model space adaptation or feature space adaptation to reduce a number of transcription errors when transcribing speech data from a particular speaker to text data corresponding to the speech data.

In one embodiment, for example, an enhanced ASR system may be operative to generate an error correction function. The error correction function may represent a mapping between a supervised set of parameters and an unsupervised training set of parameters generated using a same set of acoustic training data, and apply the error correction function to an unsupervised testing set of parameters to form a corrected set of parameters used to perform speaker adaptation. Examples of each set of parameters may include without limitation one or more transformation matrices. Examples of speaker adaptation may include without limitation model space adaptation and feature space adaptation. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 4 illustrates an embodiment of a first logic flow.

DETAILED DESCRIPTION

Various embodiments are directed to various enhanced ASR techniques. The enhanced ASR techniques may generate an error correction function that may be used to improve adaptation techniques for an enhanced ASR system. More particularly, the error correction function may be used to adapt a general or base acoustic model to a specific speaker, a technique that is sometimes generally referred to as "speaker adaptation." For instance, the error correction function may allow improved model space adaptation and/or feature space adaptation. As a result, the enhanced ASR techniques improve accuracy when transcribing acoustic speech data from a speaker into a corresponding text transcription. Accuracy may be measured in a number of different ways, including word error rate (WER), sentence error rate (SER), command success rate (CSR), and other metrics suitable for characterizing transcription errors or ASR performance.

In general, an enhanced ASR system may implement various enhanced ASR techniques to train an acoustic model A (or model-space/feature-space transform T1) based on supervised data representing correct or accurate transcriptions. The enhanced ASR system also trains an acoustic model B (or model-space/feature-space transform T2) based on unsupervised or lightly supervised data using the same data as in model A but with incorrect or inaccurate transcriptions. The enhanced ASR system compares models A, B (or T1, T2) and learns an error correction function that can map B to A (or T2 to T1). One exemplary form of the error correction function is a linear transform. For unsupervised or lightly supervised training, the enhanced ASR system takes training data as input and applies the error correction function to improve the acoustic model. For unsupervised adaptation, the enhanced ASR system takes the error correction function and applies it as part of adaptation operations during run-time of the enhanced ASR system. As a result, the enhanced ASR system improves training and adaptation operations that lead to reduced transcription errors for a given speaker.

Figure 1:
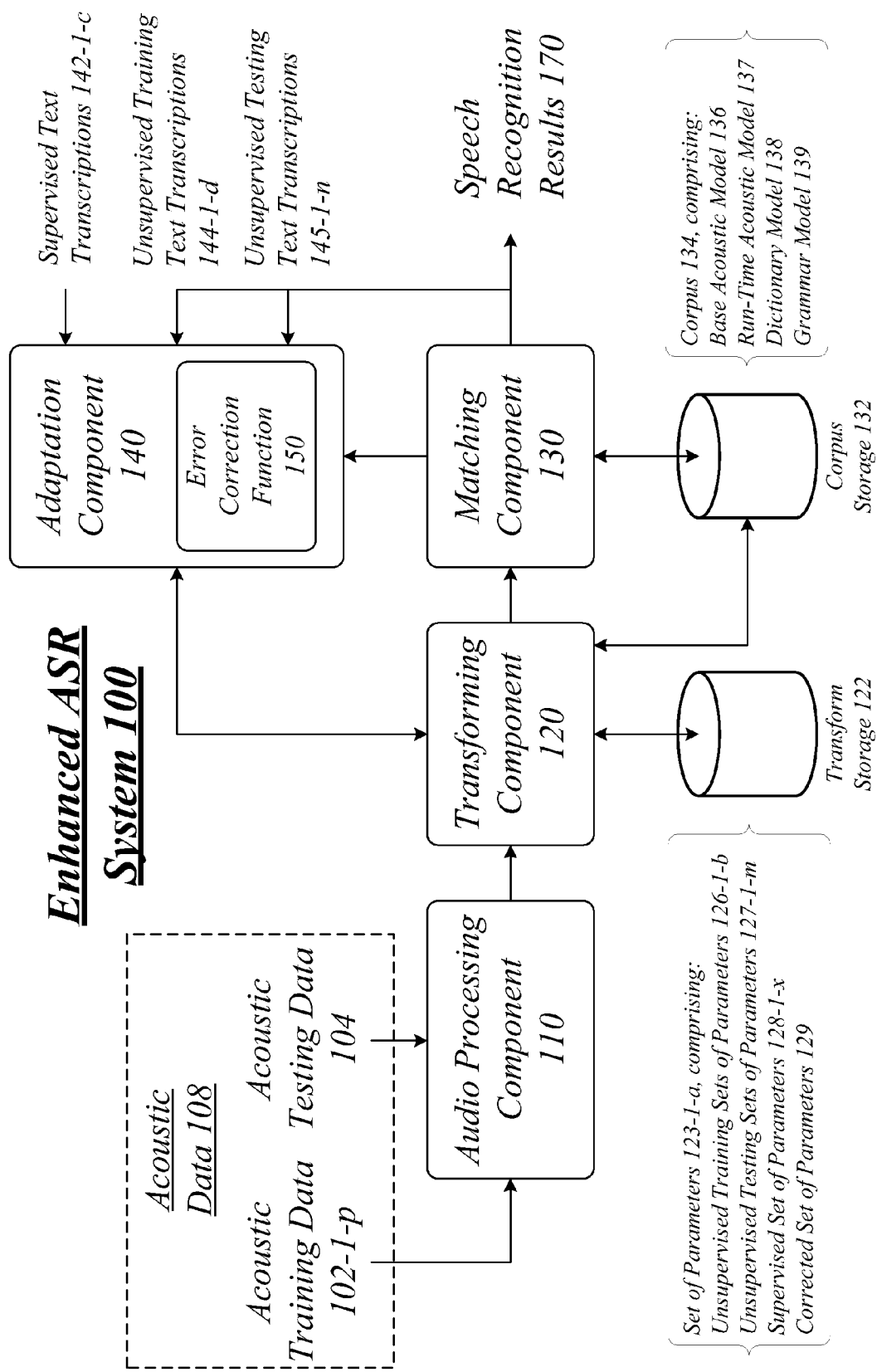
FIG. 1 illustrates an embodiment of an enhanced ASR system.

FIG. 1 illustrates a block diagram for an enhanced ASR system 100. The enhanced ASR system 100 may generally implement ASR techniques to convert speech (e.g., words, phrases, utterances, etc.) into machine-readable input (e.g., text, character codes, key presses, etc.). The machine-readable input may be used for a number of automated applications including without limitation dictation services, controlling speech-enabled applications and devices, interactive voice response (IVR) systems, mobile telephony, multimodal interaction, pronunciation for computer-aided language learning applications, robotics, video games, digital speech-to-text transcription, text-to-speech services, telecommunications device for the deaf (TDD) systems, teletypewriter (TTY) systems, text telephone (TT) systems, unified messaging systems (e.g., voicemail to email or SMS/MMS messages), and a host of other applications and services. The embodiments are not limited in this context.

In the illustrated embodiment shown in FIG. 1, the enhanced ASR system 100 may comprise a computer-implemented system having multiple components 110, 120, 130 and 140. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. Although the enhanced ASR system 100 as shown in FIG. 1 has a limited number of elements in a certain topology, it may be appreciated that the enhanced ASR system 100 may include more or less elements in alternate topologies as desired for a given implementation.

In some embodiments, the enhanced ASR system 100 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

Some or all of the components 110, 120, 130 and 140 (including associated storage) may be communicatively coupled via various types of communications media. These components may coordinate operations between each other. The coordination may involve the uni-directional or bi-directional exchange of information. For instance, the components 110, 120, 130 and 140 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In various embodiments, the enhanced ASR system 100 may be arranged to generate the error correction function 150. The error correction function 150 may represent a mapping between a supervised set of parameters 128 and an unsupervised training set of parameters 126 generated using a same set of acoustic training data 102. The enhanced ASR system 100 may apply the error correction function 150 to a base acoustic model 136 to form a run-time acoustic model 137. Additionally or alternatively, the enhanced ASR system 100 may apply the error correction function 150 to an unsupervised testing set of parameters 127 to form a corrected set of parameters 129. The enhanced ASR system 100 may then transcribe the acoustic speech data 104 from the specific speaker to a text transcription using the run-time acoustic model 137 and/or the corrected set of parameters 129.

In one sense the error correction function 150 represents mismatches between a model trained from partially error-labeled data and a model trained from correctly-labeled data. This is based on the assumption that the impact of transcription errors on a general acoustic model itself, or in a derived form such as speaker adaptation transformations, can be modeled during a training stage where both a correct text transcription (e.g., without errors) and an incorrect text transcription (e.g., with errors) are available. This is a reasonable assumption since transcription errors tend to have patterns. For instance, some conventional ASR systems utilize a confusion matrix to measure and analyze error patterns. During a deployment stage, the enhanced ASR system 100 may directly apply the error correction function 150 to correct the acoustic models that are built from the data with incorrect text transcriptions.

Representative scenarios for the enhanced ASR system 100 may include unsupervised speaker adaptation and unsupervised (or lightly supervised) training, among others. The unsupervised speaker adaptation may further include a training stage and a testing stage. The unsupervised (or lightly supervised) training may also include a training stage and a testing stage. The testing stage for both scenarios may be similar in nature. The training stage for the unsupervised (or lightly supervised) training may further include two general categories of operations. The first category may include learning an error function on a smaller set of training data where supervised transcription information is available. The second category may include applying the error function to a larger set of training data where supervised transcription information is not available.

For the scenario of speaker adaptation, during the training stage, for each desired condition (e.g., a speaker, a channel, a noise environment, an input device, etc.) in the training data, the enhanced ASR system 100 adapts a base acoustic model using supervised data (.e.g., with correct transcription) in the condition, and obtains a condition-specific model transformation. Similarly in a feature space adaptation, the enhanced ASR system 100 adapts the data to the base acoustic model and obtains a condition-specific data transformation. The enhanced ASR system 100 uses the base acoustic model to recognize the training data in this condition to generate unsupervised speech recognition results. The enhanced ASR system 100 adapts the base acoustic model using the unsupervised speech recognition results in the condition, and obtains a condition-specific model transformation. Similarly in a feature space adaptation, the enhanced ASR system 100 adapts the data to the base acoustic model and obtains a condition-specific data transformation. The enhanced ASR system 100 then compares all the transformations for each condition, and estimates the error correction function 150 from an analysis of the correct and incorrect transformations.

During the testing stage, for each set of acoustic testing data (e.g., a test utterance), the enhanced ASR system 100 uses the base acoustic model to recognize the acoustic testing data, and generates unsupervised speech recognition results. The enhanced ASR system 100 adapts the base acoustic model using the unsupervised speech recognition results, and obtains a condition-specific model transformation. Similarly in a feature space adaptation, the enhanced ASR system 100 adapts the data to the base acoustic model and obtains a condition-specific data transformation. The enhanced ASR system 100 applies the error correction function 150 to the condition-specific model transformation (or to the condition-specific data transformation) and obtains a corrected transformation. The enhanced ASR system 100 adapts the base acoustic model using the corrected transformation or similarly adapts the data using the corrected transformation. The enhanced ASR system 100 then recognizes the original test data using the adapted acoustic model, or recognizes the adapted data using the original base acoustic model.

For unsupervised or lightly supervised training, the enhanced ASR system 100 trains a model A using input data with correct transcriptions. The correct transcriptions may be derived, for example, from existing sources or by selecting a smaller subset from a larger amount of unsupervised data and having it manually transcribed by a human operator. The enhanced ASR system 100 trains a model B using the same input data but with incorrect transcriptions. For lightly supervised training, the incorrect transcriptions may be derived, for example, from close-caption services, low quality human transcription services, and so forth. The enhanced ASR system 100 compares models A, B, and learns the error correction function 150 that maps model B to model A. One example of the function is a linear transform. The enhanced ASR system 100 takes the error correction function 150 and applies it to the acoustic model that is trained from unsupervised or lightly supervised training data to improve the acoustic model.

The enhanced ASR system 100 and use of the error correction function 150 provides several advantages over conventional ASR techniques, such as confidence-based techniques. For example, the enhanced ASR system 100 may potentially achieve higher recognition accuracy than confidence-based techniques since confidence estimation is known to be a difficult problem to solve and conventional solutions are often unreliable. In addition, confidence-based techniques either discard or assign lower weights on speech data which can potentially cause errors. This reduces the amount of data available for training or adaptation. Such decisions may also be applied in error, thereby reducing or eliminating potentially useful speech data. Furthermore, confidence-based techniques need to estimate confidence during run-time. By way of contrast, the enhanced ASR system 100 introduces little or no run-time costs since the error correction function 150 is generated during training or "offline" mode.

In one embodiment, for example, an enhanced ASR system 100 may be operative to generate an error correction function 150, and use the error correction function 150 during run-time operations to improve a level of accuracy for speech recognition results. The error correction function 150 may represent a mapping between a supervised set of parameters 128-1-$x$ and an unsupervised training set of parameters 126-1-$b$ generated using a same set of acoustic training data 102-1-$p$. The parameters 128-1-$x$ and 126-1-$b$ may each comprise, for example, one or more transformation matrices. The enhanced ASR system 100 may adapt a base acoustic model 136 with acoustic speech data 104 from a specific speaker using the error correction function 150. The enhanced ASR system 100 may then transcribe the acoustic speech data 104 from the specific speaker to speech recognition results 170. The speech recognition results 170 may comprise, for example, a text transcription having fewer transcription errors than conventional ASR systems.

Referring again to FIG. 1, the enhanced ASR system 100 may include, inter alia, an audio processing component 110. The audio processing component 110 may be generally arranged to receive various types of acoustic data 108 from an input device (e.g., microphone). The audio processing component 110 may process the acoustic data 108 in preparation of matching the acoustic data to a corpus 134. The types of processing operations may include analog-to-digital conversion (ADC), characteristic vector extraction, buffering, and so forth. The specific types of processing operations may vary depending on the type of acoustic model, corpus and matching techniques implemented for the enhanced ASR system 100. The audio processing component 110 may output the processed acoustic data 108 for use by other components of the enhanced ASR system 100.

The acoustic data 108 may comprise various types of acoustic data, including without limitation acoustic training data 102 and acoustic testing data 104. Each of the different types of acoustic data may correspond to an operational phase for the enhanced ASR system 100. Acoustic training data 102 may comprise real-time or prerecorded speech data from any arbitrary number of speakers used to train the enhanced ASR system 100 during a training phase. In one embodiment, the enhanced ASR system 100 may generate the error correction function 150 during the training phase. For instance, the acoustic training data 102 may be used during development or manufacturing stages for the enhanced ASR system 100, prior to deployment to customers or end users. Acoustic testing data 104 may comprise real-time speech data from a test speaker using the enhanced ASR system 100. For instance, a customer may purchase the enhanced ASR system 100 as computer program instructions embodied on a computer-readable medium (e.g., flash memory, magnetic disk, optical disk, etc.). The acoustic testing data 104 may represent speech data from the purchaser used to train or test the enhanced ASR system 100 for adaptation to the particular speech characteristics of the purchaser. Additionally or alternatively, the acoustic testing data 104 may comprise real-time speech data from a specific speaker obtained during run-time of the enhanced ASR system 100 for actual use of the enhanced ASR system 100 for its intended purpose which is transcribing speech-to-text for a particular speech-enabled application.

The enhanced ASR system 100 may comprise a transforming component 120 communicatively coupled to the audio processing component 110. The transforming component may be generally arranged to receive the processed acoustic data 108 as input, and linearly transforms the processed acoustic data using one or more set of parameters 123-1-$a$. The transforming component 120 may output the processed acoustic data 108 to other components of the enhanced ASR system 100. It is worthy to note that, in some cases, the transforming component 120 may comprise an identical transformation function or pass-through function.

The transforming component 120 may be communicatively coupled to a transform storage 122. The transform storage 122 may comprise any computer-readable media used to store one or more set of parameters 123-1-$a$. In one embodiment, for example, the set of parameters 123-1-$a$ may include without limitation one or more unsupervised training sets of parameters 126-1-$b$, unsupervised testing sets of parameters 127-1-$m$, supervised sets of parameters 128-1-$x$, and a corrected set of parameters 129.

The set of parameters 123-1-$a$ may be generally used, for example, to implement various speaker adaptation techniques, including without limitation model space adaptation or feature space adaptation. Model space adaptation uses speech data from a particular speaker and adapts an acoustic model to better match the data. Feature space adaptation uses speech data from a particular speaker and adapts the speech data to better match the acoustic model. Both adaptation techniques allow a speech recognition system to be adapted to a specific speaker, thereby improving or optimizing speech recognition for the specific speaker. Such adaptation is performed by analyzing mismatches between input speech of a given speaker and an acoustic model, and generating one or multiple transformation matrices for transforming the input speech to better match the acoustic model (or vice-versa). Thereafter, the transformation matrix is obtained and refined during training or testing stages before regular use of the enhanced ASR system 100.

The enhanced ASR system 100 may comprise a matching component 130 communicatively coupled to the transforming component 120. The matching component 130 may be generally arranged to receive acoustic data, and match the acoustic data to a base acoustic model 136 to produce speech recognition results 170. The matching component 130 may perform matching operations using, for example, a continuous Hidden Markov Model (HMM) methodology or similar techniques for temporal pattern recognition. The matching component 130 may output the speech recognition results 170 to other components of the enhanced ASR system 100. Additionally or alternatively, the matching component 130 may output the speech recognition results 170 to components, applications or devices external to the enhanced ASR system 100, such as one or more speech-enabled applications.

The speech recognition results 170 may represent the intended output for the enhanced ASR system 100. The enhanced ASR system 100 generally converts human communication from a first modality (e.g., spoken words or speech) to a second modality (e.g., text). The speech recognition results 170 may represent the second modality, which comprises any other modality other than first modality, including without limitation machine-readable information, computer-readable information, text transcription, number transcription, symbol transcription, or derivatives thereof. In one embodiment, for example, the speech recognition results 170 may represent text transcriptions. The text transcriptions may comprise both supervised text transcriptions, unsupervised text transcriptions, and lightly supervised transcriptions. A supervised text transcription may comprise a text transcription that has been specifically reviewed for errors by a human operator or more sophisticated ASR system. Therefore a supervised text transcription is typically a highly accurate text transcription (few if any transcription errors) for speech data provided a speaker. An unsupervised text transcription, on the other hand, has not been reviewed for errors and therefore typically comprises a text transcription with some undesired level of transcription errors. A lightly supervised text transcription has some low level of error review, such as from close-caption services, low quality human transcription services, and so forth. A lightly supervised text transcription still contains some transcription errors.

The transforming component 120 and the matching component 130 may be communicatively coupled to a corpus storage 132. The corpus storage 132 may comprise any computer-readable media used to store a corpus 134. The corpus 134 may comprise a database of speech audio files and text transcriptions in a format that can be used to form acoustic models. In one embodiment, for example, the corpus 134 may comprise a base acoustic model 136, a dictionary model 138 and a grammar model 139 (alternatively referred to as a "language model"). The base acoustic model 136 may comprise a set of model parameters representing the acoustic characteristics for a set of speech audio files. Different models can be used such as hidden markov models (HMMs), neural networks, and so forth. The speech audio files may comprise various types of speech audio files, including read speech (e.g., book excerpts, broadcast news, word lists, number sequences, etc.) and spontaneous speech (e.g., conversational speech). The speech audio files may also represent speech from any arbitrary number of speakers. The dictionary model 138 may comprise a word dictionary that describes phonology of the speech in a relevant language. The grammar model 139 may comprise a grammar regulation (language model) which describes how to link or combine the words registered in the dictionary model 138 in a relevant language. For instance, the grammar model 139 may use grammar rules based on a context-free grammar (CFG) and/or a statistic word linking probability (N-gram).

In some embodiments, the base acoustic model 136 may comprise a set of model parameters representing acoustic characteristics for each predetermined unit, such as phonetic-linguistic-units. The acoustic characteristics may include individual phonemes and syllables for recognizing speech in a given language. The matching component 130 may utilize a technique for finding temporal recognition patterns, such as a continuous HMM technique. In this case, the base acoustic model 136 may utilize an HMM having a Gaussian distribution used for calculating a probability for observing a predetermined series of characteristic vectors, such as the characteristic vectors 204 described with reference to FIG. 2.

The enhanced ASR system 100 may comprise an adaptation component 140 communicatively coupled to the matching component 130 and the transforming component 120. The adaptation component 140 may implement various speaker adaptation techniques for the enhanced ASR system 100, including speaker adaptation techniques that utilize the error correction function 150. The adaptation component 140 may be generally arranged to receive various inputs, including the speech recognition results 170 in the form of one or more supervised text transcriptions 142-1-$c$, unsupervised (or lightly supervised) training text transcriptions 144-1-$d$, and unsupervised testing text transcriptions 145-1-$n$. The adaptation component 140 may then generate, modify or delete the set of parameters 123-1-$a$ stored by the transform storage 122 using the various transcriptions. The adaptation component 140 may also generate, modify or delete the error correction function 150 using the various transcriptions and corresponding transformation matrices, and may use the error correction function 150 to generate the corrected set of parameters 129 and/or the run-time acoustic model 137.

The output and performance of the enhanced ASR system 100 may vary according to a particular operational phase for the enhanced ASR system 100. In one embodiment, the enhanced ASR system 100 may have two operational phases including a training phase and a testing phase. During the training phase, the enhanced ASR system 100 may be trained to generate the error correction function 150. During the testing phase, the enhanced ASR system 100 may be used for its intended purpose during normal operations using the error correction function 150 to produce speech recognition results 170. Each operational phase will be further described below.

Training Phase

During the training phase, the enhanced ASR system 100 may be trained to generate the error correction function 150. In various embodiments, the error correction function 150 represents a mapping between one or more supervised set of parameters 128-1-$x$ and one or more unsupervised training sets of parameters 126-1-$b$ generated using a same set of acoustic training data 102-1-$p$.

In one embodiment, for example, the audio processing component 110 may receive and process acoustic data 108 in the form of acoustic training data 102-1-*p*. The acoustic training data 102-1-*p* may represent speech data from any number of speakers. For example, assume a first set of acoustic training data 102-1 represents speech data from a first speaker, a second set of acoustic training data 102-2 represents speech data from a second speaker, and a third set of acoustic training data 102-3 represents speech data from a third speaker. The audio processing component 110 processes each set of acoustic training data 102 and outputs the processed acoustic training data acoustic to the matching component 130 (optionally passing through the transforming component 120).

The matching component 130 may match the acoustic training data to the base acoustic model 136 to produce the speech recognition results 170. In this case, the speech recognition results 170 comprise an unsupervised training text transcription 144-1-*d*. The unsupervised training text transcription 144-1-*d* may comprise a text transcription with errors. The matching component 130 outputs the unsupervised training text transcription 144-1-*d* to the adaptation component 140.

The adaptation component 140 receives the unsupervised training text transcription 144-1-*d* from the matching component 130. The adaptation component 140 generates an unsupervised training set of parameters 126-1-*b* using the acoustic training data 102, the base acoustic model 136 and the unsupervised training text transcription 144-1-*d*.

The adaptation component 140 receives a supervised text transcription 142-1-*c*. The supervised text transcription 142-1-*c* comprises a text transcription without errors. More particularly, the supervised text transcription 142-1-*c* comprises a text transcription of the acoustic training data 102-1-*p* that has been previously reviewed and corrected for transcription errors. The previous review may have been performed by a human operator (e.g., a proofreader) or a more sophisticated ASR system, such as a Defense Advanced Research Projects Agency (DARPA) Rich Transcription system, for example. In any event, the supervised text transcription 142-1-*c* may be realized using any conventional review technique as long as it provides an error-free or near error-free text transcription of the acoustic training data 102-1-*p*. The supervised text transcription 142-1-*c* may be obtained at any time prior to or during the training phase, although typical implementations store the supervised text transcription 142-1-*c* in a memory unit accessible by the adaptation component 140.

The adaptation component 140 may generate a first supervised set of parameters 128-1 using a first acoustic training data 102-1, the base acoustic model 136 and a first supervised text transcription 142-1. This technique is similar to the one used to derive the unsupervised training set of parameters 126-1-*b*, with the difference that the unsupervised training set of parameters 126-1-*b* are generated using an unsupervised training text transcription 144-1-*d*, while the supervised set of parameters 128-1-*x* is generated using the supervised text transcription 142-1-*c*. Additionally or alternatively, the adaptation component 140 may retrieve the supervised set of parameters 128-1-*x* as previously generated and stored in the transform storage 122.

The adaptation component 140 may compare and map an unsupervised training set of parameters 126-1-*b* to a supervised set of parameters 128-1-*x* to form the error correction function 150. The error correction function 150 may be refined to any desired level of accuracy using any number of additional training cycles. For instance, similar operations may be performed using additional sets of acoustic training data 102 (e.g., 102-2, 102-3 . . . 102-*p*) to form additional unsupervised training text transcriptions 144 (e.g., 144-2, 144-3 . . . 144-*d*) and generate additional unsupervised training sets of parameters 126 (e.g., 126-2, 126-3 . . . 126-*b*). Further, similar operations may be performed using additional supervised text transcriptions 142 (e.g., 142-2, 142-3 . . . 142-*c*) to generate additional supervised sets of parameters 128 (e.g., 128-2, 128-3 . . . 128-*x*). The adaptation component 140 may then compare and map the additional training sets of parameters 126-2-*b* to the additional supervised sets of parameters 128-2-*x* to further refine the error correction function 150.

Once the desired number of pairs of supervised and unsupervised sets of parameters have been generated, the adaptation component 140 may compare them and estimate a mapping function F that can map the set pairs to derive the error correction function 150, represented as follows:

$$P(126\text{-}1)*F\sim=P(128\text{-}1)$$

$$P(126\text{-}2)*F\sim=P(128\text{-}2)$$

$$P(126\text{-}b)*F\sim=P(128\text{-}x)$$

This may be accomplished a number of different ways. For instance, the adaptation component 140 may map the set pairs using a linear transform with minimum mean square error (MMSE) technique to create the error correction function 150. It may be appreciated that other ways are possible as well. The adaptation component 140 then stores the error correction function 150 for use during the testing and run-time phases for the enhanced ASR system 100.

Testing Phase

During the testing phase, the enhanced ASR system 100 may apply the error correction function 150 generated during the training phase to an unsupervised testing set of parameters 127-1-*m* generated during the testing phase to form a corrected set of parameters 129 for speaker adaptation in either feature space or model space.

In one embodiment, for example, the audio processing component 110 may receive and process acoustic testing data 104 from a specific speaker. The audio processing component 110 may output the processed acoustic testing data to the matching component 130 (optionally passing through the transforming component 120).

The matching component 130 may receive the acoustic testing data 104, and match the acoustic testing data 104 to the base acoustic model 136 to produce speech recognition results 170 in the form of an unsupervised testing text transcription 145-1-*n*. The matching component 130 may output the unsupervised testing text transcription 145-1-*n* to the adaptation component 140.

The adaptation component 140 may receive the unsupervised testing text transcription 145-1-*n*, and generate an unsupervised testing set of parameters 127-1-*m* using the acoustic testing data 104, the base acoustic model 136 and the unsupervised testing text transcription 145-1-*n*.

The adaptation component 140 may apply the error correction function 150 to the unsupervised testing set of parameters 127-1-*m* to form the corrected set of parameters 129. For feature space adaptation, the transforming component 120 then transforms the processed acoustic speech data 104 using the corrected set of parameters 129. The transforming component 120 may output the transformed acoustic speech data to the matching component 130. The matching component 130 may match the transformed acoustic speech data to the base acoustic model 136 to produce speech recognition results 170. For model space adaptation, the transforming component 120 may transform the base acoustic model 136 as stored in the corpus storage 132 to form the run-time acoustic model 137. The matching component 130 may match the processed acoustic speech data to the run-time acoustic model 137 to produce speech recognition results 170. It is worthy to note that for unsupervised speaker adaptation, the enhanced ASR system 100 recognizes the testing speech twice, first without transforming (e.g. adaptation) and second with transforming.

Figure 2:
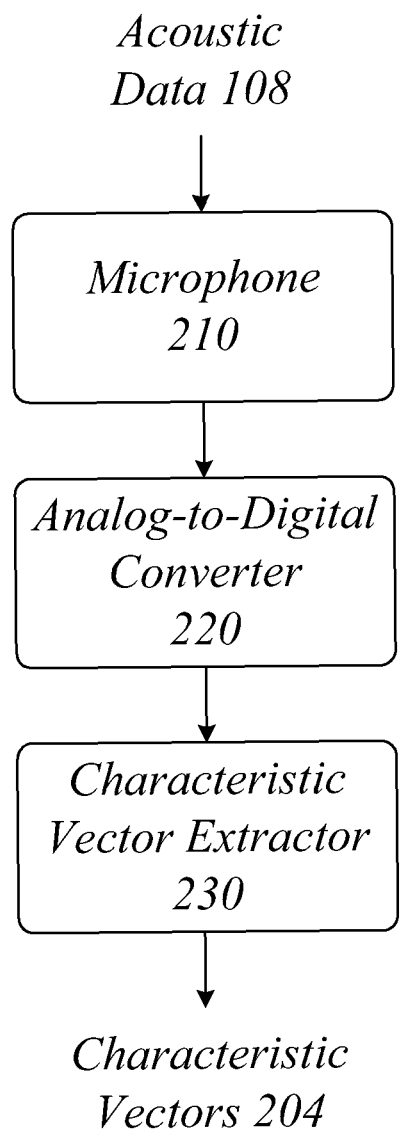
FIG. 2 illustrates an embodiment of an audio processing component.

FIG. 2 illustrates a more detailed block diagram of the audio processing component 110. As previously described, the audio processing component 110 may be generally arranged to receive various types of acoustic data 108 from an input device (e.g., microphone). The audio processing component 110 may process the acoustic data 108 in preparation of matching the acoustic data to the corpus 132.

In the embodiment shown in FIG. 2, the audio processing component 110 may comprise a microphone 210 arranged to receive acoustic data 108. The acoustic data 108 may comprise speech inputted to a microphone 210. The microphone 210 converts the analog acoustic data 108 to an electrical analog speech signal. The electrical analog speech signal is output to an analog-to-digital converter (ADC) 220.

The ADC 220 receives the electrical speech signal from the microphone 210. The ADC 220 quantizes the continuous analog speech signal to a discrete set of values to form a digital speech signal. The ADC 220 outputs the digital speech signal to a characteristic vector extractor 230.

The characteristic vector extractor 230 receives the digital speech signal from the ADC 220. The characteristic vector extractor 230 performs acoustic analysis of the digital speech signal on a frame-by-frame basis. A Fourier transform or similar technique may be used for analyzing the digital speech signal. The characteristic vector extractor 230 extracts one or more characteristic vectors 204 representative of the digital speech signal and suitable for comparison with the corpus 132. For instance, the characteristic vector extractor 230 may extract the characteristic vectors 204 from the digital speech signal as Mel-frequency cepstral coefficients (MFCCs), spectrum coefficients, linear predictive coefficients, cepstral coefficients, linear spectrum coefficients, and so forth. The characteristic vectors 204 may be output to the transforming component 120 in real-time, or may be stored in a buffer as a time series of characteristic vectors 204 for each frame of the acoustic data 108.

Figure 3:
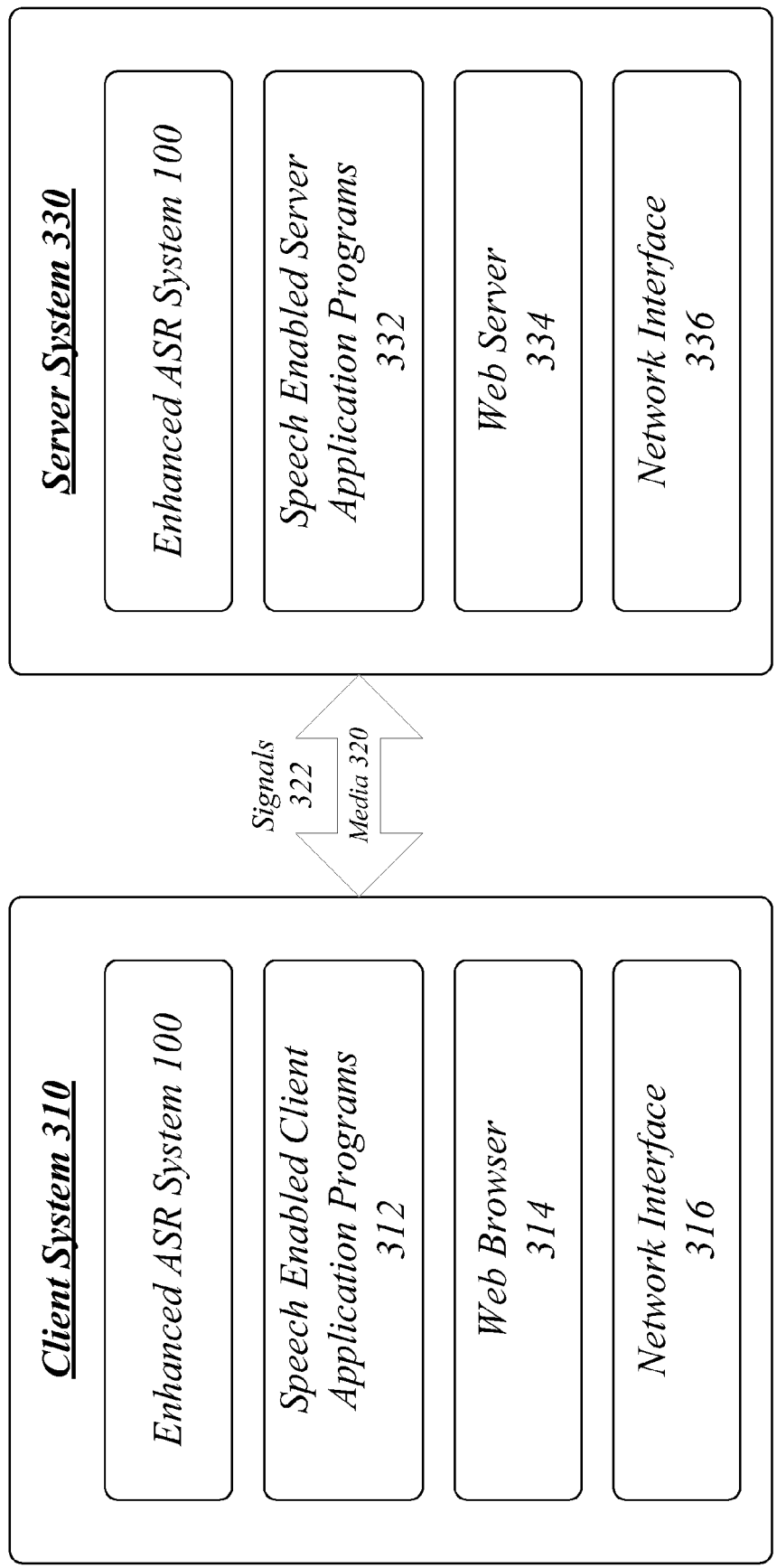
FIG. 3 illustrates an embodiment of a distributed system.

FIG. 3 illustrates a block diagram of a distributed system 300. The distributed system 300 may distribute portions of the structure and/or operations for the systems 100, 200 across multiple computing entities. Examples of distributed system 300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, for example, the distributed system 300 may be implemented as a client-server system. A client system 310 may implement the enhanced ASR system 100, one or more speech-enabled client application programs 312, a web browser 314, and a network interface 316. Additionally or alternatively, a server system 330 may implement the enhanced ASR system 100, as well as one or more speech-enabled server application programs 332, a web server 334, and a network interface 336. The systems 310, 330 may communicate with each over a network using communications media 320 and communications signals 322 via network interfaces 316, 336. In one embodiment, for example, the communications media may comprise wired or wireless communications media. In one embodiment, for example, the communications signals 322 may comprise the audio data 108 and/or the speech recognition results 170 communicated using a suitable network protocol.

In various embodiments, the enhanced ASR system 100 may be deployed as a server-based program accessible by one or more client devices 310. In this case, the server system 330 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 330 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs such as Microsoft® Office Communications Server (OCS) for managing incoming and outgoing messages, messaging server programs such as Microsoft® Exchange Server for providing unified messaging (UM) for e-mail, voicemail, VoIP, instant messaging (IM), group IM, enhanced presence, and audio-video conferencing, and/or other types of programs, applications, or services in accordance with the described embodiments.

In various embodiments, the enhanced ASR system 100 may be deployed as a web service provided by the server system 330 and accessible by one or more client devices 310. The server system 330 may comprise a web server 334. In various implementations, the web server 334 may provide an application environment such as an Internet Information Services (IIS) and/or Application Server Page (ASP) environment for hosting applications. In such implementations, the web server 334 may support the development and deployment of applications using a hosted managed execution environment (e.g., .NET Framework) and various web-based technologies and programming languages such as HTML, XHTML, CSS, Document Object Model (DOM), XML, XSLT, XMLHttpRequestObject, JavaScript, ECMAScript, Jscript, Ajax, Flash®, Silverlight™, Visual Basic® (VB), VB Scripting Edition (VBScript), PHP, ASP, Java®, Shockwave®, Python, Perl®, C#/.net, and/or others. In some embodiments, the applications deployed by the web server 334 may include managed code workflow applications, web-based applications, and/or combination thereof.

When deployed as a server based program or web service, the client system 310 may receive acoustic data 108, such as acoustic speech data 104, at an input device (e.g., microphone 210) implemented by the client system 310, and send the acoustic data 108 to the server system 330 using the communications media 320 and communications signals 322. The enhanced ASR system 100 implemented by the server system 330 may convert the acoustic data 108 to speech recognition results 170, and send the speech recognition results 170 to the client system 310 for use with speech-enabled client application programs 312. Additionally or alternatively, speech recognition results 170 may be used to control one or more speech-enabled server application programs 332 or the web server 334.

In various embodiments, the enhanced ASR system 100 may be deployed as a stand-alone client program provided by the client device 310. In this case, a speaker may use the enhanced ASR system 100 as implemented by the client system 310 to perform speech-to-text operations. For example, a speaker may perform transcription operations using a word processing application as one of the speech-enabled client application programs 312, where the speaker talks into the microphone 210 and a text transcription appears in real-time or near real-time in an open document displayed on an output device for the client device 310, such as an electronic display. In another example, a speaker may control various operations for the client system 310, by using the enhanced ASR system 100 to transcribe voice commands into machine-readable signals suitable for controlling system applications, such as an operating system for the client system 310.

In various embodiments, portions or different versions of the enhanced ASR system 100 may be deployed on both systems 310, 330. A speaker may use the enhanced ASR system 100 on the client system 310 to interact and control services provided by the server system 330 over a network using the appropriate communications media 320 and communications signals 322. For instance, a speaker may utilize the ASR system 100 to convert voice commands into speech recognition results 170, and send the speech recognition results 170 as communications signals 322 over the communications media 320 to use or control the speech-enabled server application programs 332 or web server 334. In this manner, a doctor might use dictation services provided as one of the speech-enabled server application programs 332, or browse the Internet using the web browser 314 and web server 334.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 4 illustrates one embodiment of a logic flow 400. The logic flow 400 may be representative of some or all of the operations executed by one or more embodiments described herein.

In the illustrated embodiment shown in FIG. 4, the logic flow 400 may generate an error correction function for an automatic speech recognition system, the error correction function representing a mapping between a supervised set of parameters and an unsupervised training set of parameters generated using a same set of acoustic training data at block 402. For example, the adaptation component 140 may generate an error correction function 150 for the enhanced ASR system 100. The error correction function 150 may represent a logical mapping between a supervised set of parameters 128-1-$x$ and an unsupervised training set of parameters 126-1-$b$, both generated using a same set of acoustic training data 102-1-$p$. In one embodiment, for example, each set of parameters 128, 126 may comprise one or more transformation matrices. The embodiments are not limited in this context.

The logic flow 400 may apply the error correction function to an unsupervised testing set of parameters to form a corrected set of parameters used to perform speaker adaptation at block 404. For example, the adaptation component 140 may apply the error correction function 150 to an unsupervised testing set of parameters 127-1-$m$ to form a corrected set of parameters 129 used to perform speaker adaptation. In one embodiment, for example, the unsupervised testing set of parameters 127-1-$m$ may comprise one or more transformation matrices. The embodiments are not limited in this context.

In various embodiments, the speaker adaptation may comprise feature space adaptation, model space adaptation, or a combination of both feature space adaptation and model space adaptation. In one embodiment, for example, the enhanced ASR system 100 may implement feature space adaptation by processing acoustic testing data 104 from a test speaker, transforming processed acoustic testing data 104 using the corrected set of parameters 129, and matching acoustic speech data to the base acoustic model 136 to produce a text transcription. In one embodiment, for example, the enhanced ASR system 100 may implement model space adaptation by processing acoustic testing data 104 from a test speaker, transforming the base acoustic model 136 using the corrected set of parameters 129 to form a run-time acoustic model 137, and matching processed acoustic speech data to the run-time acoustic model 137 to produce a text transcription. The embodiments are not limited in this context.

Figure 5:
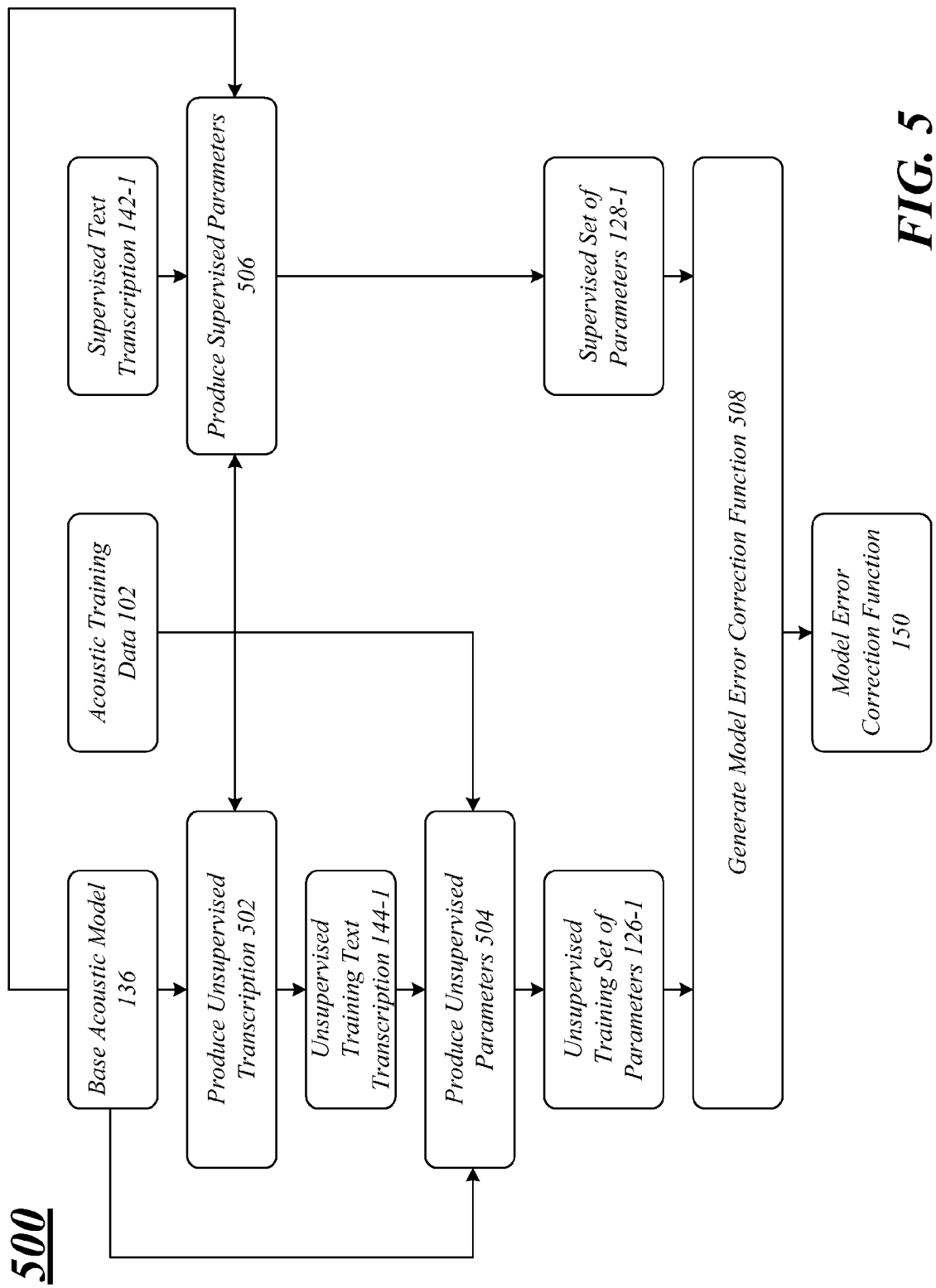
FIG. 5 illustrates an embodiment of a second logic flow.

FIG. 5 illustrates one embodiment of a logic flow 500. The logic flow 500 may be representative of some or all of the operations executed by one or more embodiments described herein. For instance, the logic flow 500 may be representative of some or all of the operations executed by the enhanced ASR system 100 during a training phase of operations.

In the illustrated embodiment shown in FIG. 5, the logic flow 500 receives as input the base acoustic model 136 and the acoustic training data 102, and outputs the unsupervised training text transcription 144 at block 502. The logic flow 500 receives as input the base acoustic model 136, the acoustic training data 102 and the unsupervised training text transcription 144, and outputs the unsupervised training set of parameters 126-1 at block 504. The logic flow 500 receives as input the base acoustic model 136, the acoustic training data 102 and the supervised text transcription 142, and outputs the supervised set of parameters 128-1 at block 506. The logic flow 500 receives as input the unsupervised training set of parameters 126-1 and the supervised set of parameters 128-1, and outputs the error correction function 150 at block 508. It may be appreciated that the logic flow 500 may execute multiple cycles to produce multiple set pairs (e.g., 126-2, 128-2; 126-3, 128-3; and 126-$b$, 128-$x$) to refine the error correction function 150 to a desired level of accuracy.

Figure 6:
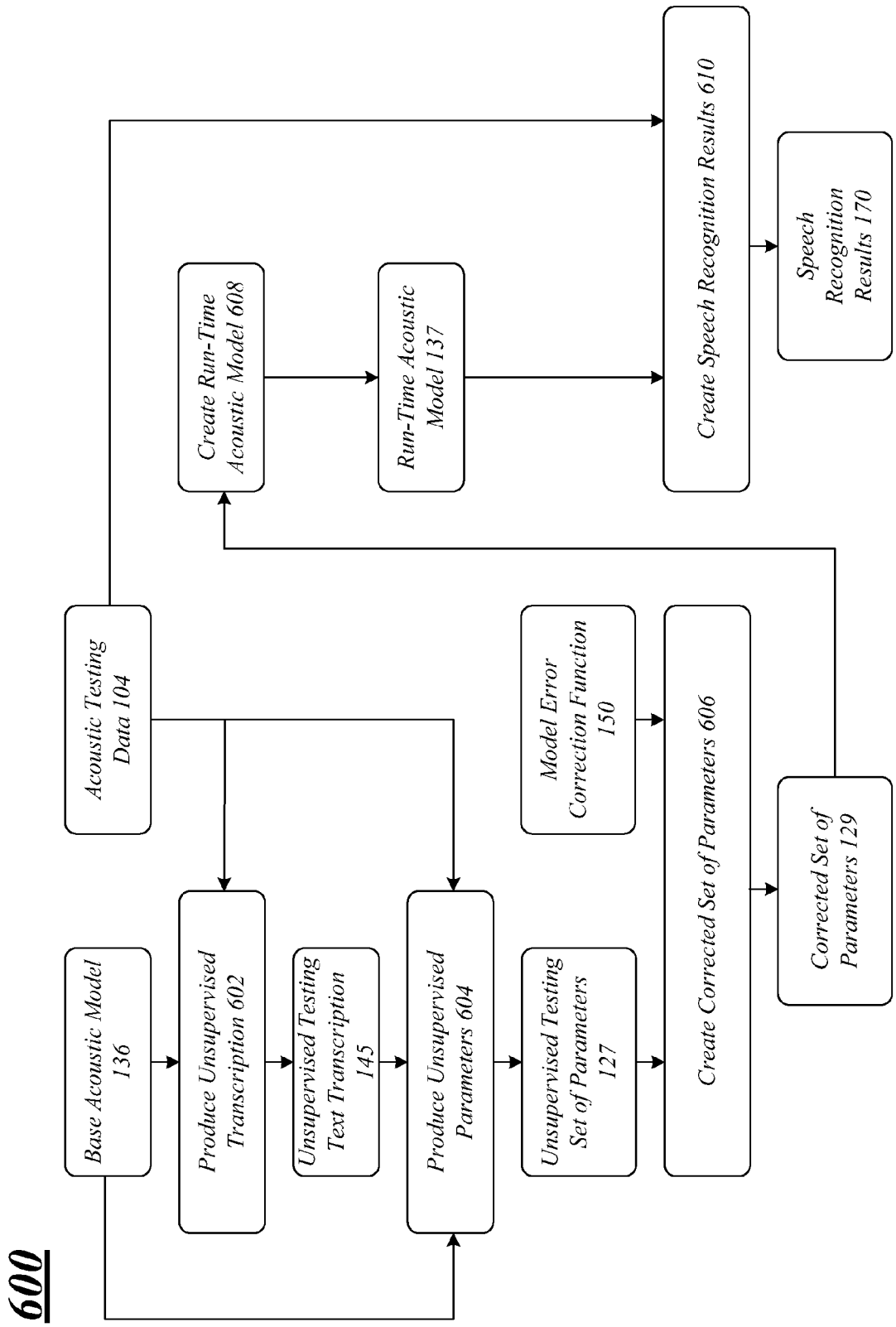
FIG. 6 illustrates an embodiment of a third logic flow.

FIG. 6 illustrates one embodiment of a logic flow 600. The logic flow 600 may be representative of some or all of the operations executed by one or more embodiments described herein. For instance, the logic flow 600 may be representative of some or all of the operations executed by the enhanced ASR system 100 during a testing phase of operations. The embodiments are not limited in this context.

In the illustrated embodiment shown in FIG. 6, the logic flow 600 receives as input the base acoustic model 136 and the acoustic testing data 104, and outputs the unsupervised testing text transcription 145 at block 602. The logic flow 600 receives as input the base acoustic model 136, the acoustic testing data 104 and the unsupervised testing text transcription 145, and outputs the unsupervised testing set of parameters 127 at block 604. The logic flow 600 receives as input the unsupervised testing set of parameters 127 and the error correction function 150, and outputs the corrected set of parameters 129 at block 606. The logic flow 600 receives as input the corrected set of parameters 129, and outputs a run-time acoustic model 137 at block 608. The logic flow 600 receives as input the run-time acoustic model 137 and the acoustic testing data 104, and outputs speech recognition results 170 at block 610. The embodiments are not limited in this context.

Figure 7:
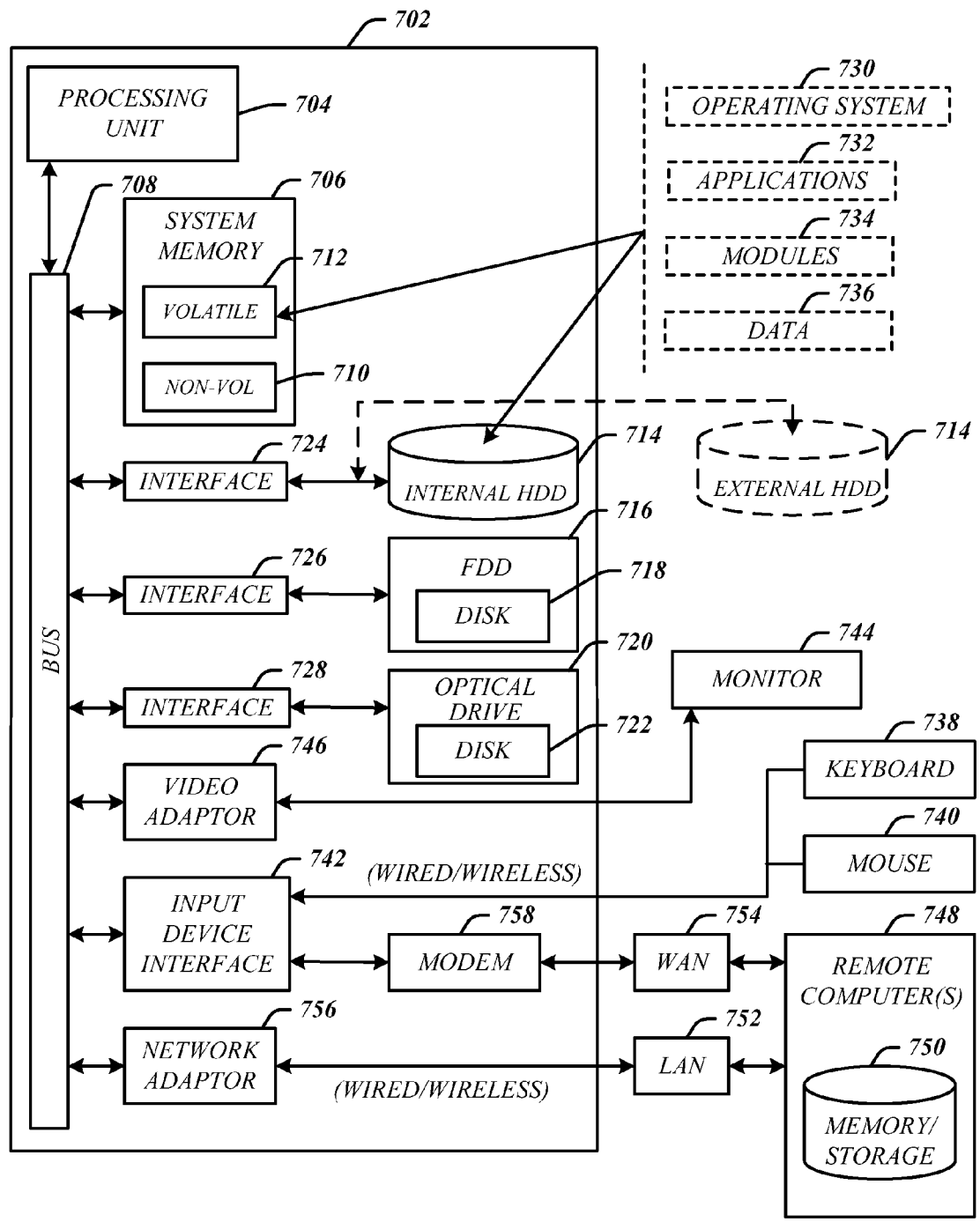
FIG. 7 illustrates an embodiment of a computing architecture.

FIG. 7 illustrates an embodiment of an exemplary computing architecture 700 suitable for implementing various embodiments as previously described, such as the enhanced ASR system 100, the client system 310 and the server system 330, for example. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, the enhanced ASR system 100 and its various components 110, 120, 130 and 140 (and associated storage 122, 132).

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
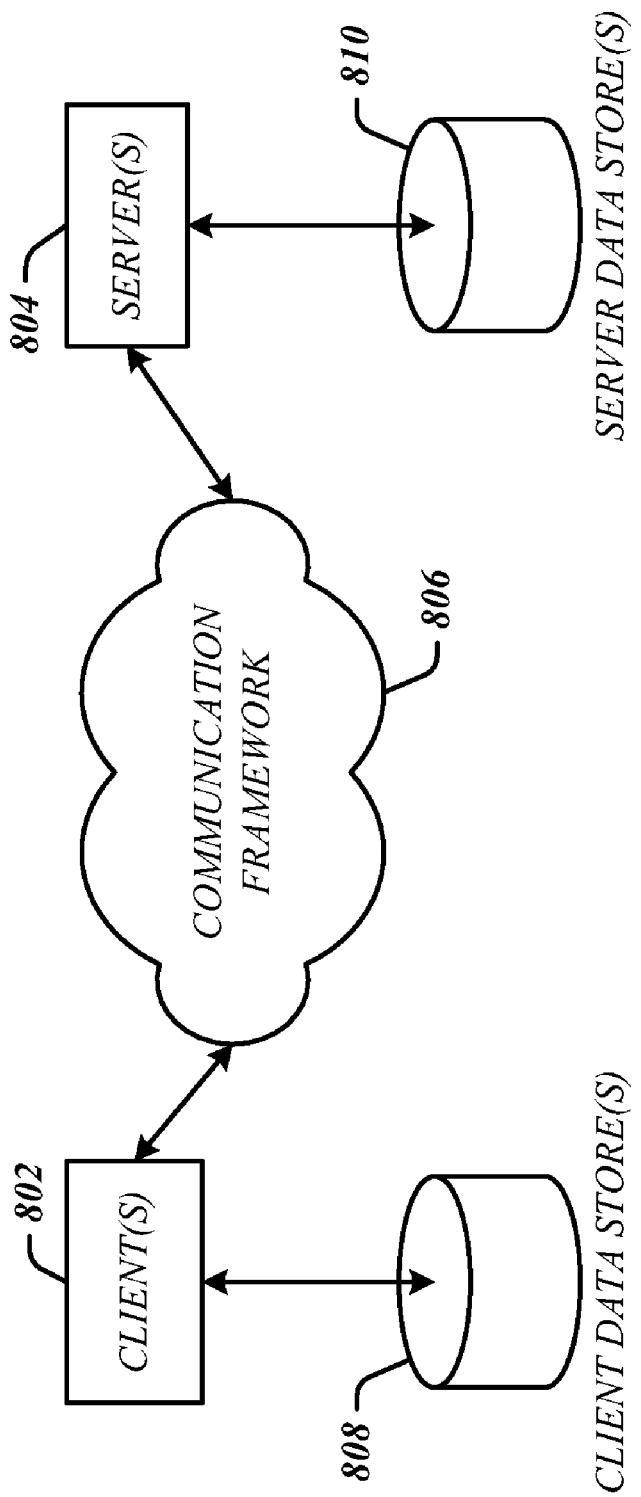
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client systems 310, 400. The servers 804 may implement the server system 330. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
generating an error correction function for an automatic speech recognition system, the error correction function representing a mapping between a supervised set of parameters and an unsupervised training set of parameters generated using a same set of acoustic training data; and
applying the error correction function to an unsupervised testing set of parameters to form a corrected set of parameters used to perform speaker adaptation.

2. The computer-implemented method of claim 1, wherein each set of parameters comprise one or more transformation matrices.

3. The computer-implemented method of claim 1, wherein the speaker adaptation comprises feature space adaptation or model space adaptation.

4. The computer-implemented method of claim 1, comprising:
processing acoustic training data;
matching the acoustic training data to a base acoustic model to produce an unsupervised training text transcription;
generating the unsupervised training set of parameters using the acoustic training data, the base acoustic model and the unsupervised training text transcription; and
mapping the unsupervised training set of parameters to a supervised set of parameters to form the error correction function.

5. The computer-implemented method of claim 4, comprising generating the supervised set of parameters using the acoustic training data, the base acoustic model and a supervised text transcription.

6. The computer-implemented method of claim 5, wherein the unsupervised training text transcription comprises a text transcription with errors, and the supervised text transcription comprises a text transcription without errors.

7. The computer-implemented method of claim 4, comprising mapping the unsupervised training set of parameters to the supervised set of parameters using a linear transform to form the error correction function.

8. The computer-implemented method of claim 1, comprising:
processing acoustic testing data from a test speaker;
matching the acoustic testing data to the base acoustic model to produce an unsupervised testing text transcription;
generating an unsupervised testing set of parameters using the acoustic testing data, the base acoustic model and an unsupervised testing text transcription; and
applying the error correction function to the unsupervised testing set of parameters to form the corrected set of parameters.

9. The computer-implemented method of claim 8, comprising:
processing acoustic speech data from the test speaker;
transforming processed acoustic speech data using the corrected set of parameters; and
matching acoustic speech data to the base acoustic model to produce the text transcription.

10. The computer-implemented method of claim 8, comprising:
processing acoustic speech data from the test speaker;
transforming the base acoustic model using the corrected set of parameters to form a run-time acoustic model; and
matching processed acoustic speech data to the run-time acoustic model to produce the text transcription.

11. A computer-readable storage medium storing computer-executable program instructions that when executed cause a computing system to:
generate an error correction function for an automatic speech recognition system, the error correction function representing a mapping between a supervised set of parameters and an unsupervised training set of parameters generated using a same set of acoustic training data;
adapt a base acoustic model or acoustic speech data from a test speaker using the error correction function; and
transcribe the acoustic speech data from the test speaker to produce speech recognition results.

12. The computer-readable storage medium of claim 11, further comprising stored computer-executable program instructions that when executed cause the computing system to adapt the base acoustic model using model space adaptation or adapt the acoustic speech data using feature space adaptation.

13. The computer-readable storage medium of claim 11, further comprising stored computer-executable program instructions that when executed cause the computing system to:
process acoustic testing data from the test speaker;
match the acoustic testing data to the base acoustic model to produce an unsupervised testing text transcription;
generate an unsupervised testing set of parameters using the acoustic testing data, the acoustic model and the unsupervised testing text transcription; and
apply the error correction function to the unsupervised testing set of parameters to form a corrected set of parameters.

14. The computer-readable storage medium of claim 13, further comprising stored computer-executable program instructions that when executed cause the computing system to transform the processed acoustic speech data using the corrected set of parameters, and match the transformed acoustic speech data to the acoustic model to produce the speech recognition results.

15. The computer-readable storage medium of claim 13, further comprising stored computer-executable program instructions that when executed cause the computing system to transform the base acoustic model using the corrected set of parameters, and match the processed acoustic speech data to the transformed acoustic model to produce the speech recognition results.

16. A system, comprising:
an enhanced automatic speech recognition system operative to generate an error correction function, the error correction function representing a mapping between a supervised set of parameters and an unsupervised training set of parameters generated using a same set of acoustic training data, and apply the error correction function to an unsupervised testing set of parameters to form a corrected set of parameters used to perform speaker adaptation.

17. The system of claim 16, comprising:
an audio processing component operative to process acoustic training data;
a matching component operative to match the acoustic training data to a base acoustic model to produce an unsupervised training text transcription; and
an adaptation component operative to generate the unsupervised training set of parameters using the acoustic training data, the base acoustic model and the unsupervised training text transcription, and map the unsupervised training set of parameters to a supervised set of parameters to form the error correction function.

18. The system of claim 16, comprising:
the audio processing component operative to process acoustic testing data from a test speaker;
the matching component operative to match the acoustic testing data to the base acoustic model to produce an unsupervised testing text transcription; and
the adaptation component operative to generate an unsupervised testing set of parameters using the acoustic testing data, the base acoustic model and an unsupervised testing text transcription, and apply the error correction function to the unsupervised testing set of parameters to form a corrected set of parameters.

19. The system of claim 16, comprising:
the audio processing component operative to process acoustic speech data from a test speaker;
a transforming component operative to transform the processed acoustic speech data using a corrected set of parameters; and
the matching component operative to match the transformed acoustic speech data to the base acoustic model to produce the text transcription.

20. The system of claim 16, comprising:
the audio processing component operative to process acoustic speech data from the test speaker;
a transforming component operative to transform the base acoustic model using a corrected set of parameters to form a run-time acoustic model; and
the matching component operative to match the processed acoustic speech data to the run-time acoustic model to produce the text transcription.

* * * * *